US 6,569,932 B2

(12) United States Patent
Hsiao et al.

(10) Patent No.: US 6,569,932 B2
(45) Date of Patent: May 27, 2003

(54) BLENDS OF ORGANIC SILICON COMPOUNDS WITH ETHYLENE-BASED POLYMERS

(76) Inventors: Benjamin S. Hsiao, 86 Old Field Rd., Setauket, NY (US) 11733; Benjamin Chu, 27 View Rd., Setauket, NY (US) 11733; Xuan Fu, 62 Oneida Ave., Centereach, NY (US) 11720; Rusty L. Blanski, 44448 Overland Ave., Lancaster, CA (US) 93536; Shawn H. Phillips, 2763 Legends Way, Lancaster, CA (US) 93536

( * ) Notice: Subject to any disclaimer, the term of this patent is extended or adjusted under 35 U.S.C. 154(b) by 0 days.

(21) Appl. No.: 09/900,408

(22) Filed: Jul. 6, 2001

(65) Prior Publication Data

US 2003/0018109 A1 Jan. 23, 2003

(51) Int. Cl.[7] .................................................. C08K 5/54
(52) U.S. Cl. ........................ 524/269; 524/442; 524/585; 524/586
(58) Field of Search ................................. 524/269, 442

(56) References Cited

U.S. PATENT DOCUMENTS

| 5,043,789 | A | | 8/1991 | Linde et al. ................ 357/52 |
| 5,047,492 | A | * | 9/1991 | Weidner et al. ............. 528/15 |
| 5,227,103 | A | | 7/1993 | Muschiatti ................ 264/45.9 |
| 5,256,720 | A | * | 10/1993 | Kuwata et al. ............. 524/492 |
| 5,384,376 | A | * | 1/1995 | Tunney et al. ............... 525/431 |
| 5,412,053 | A | | 5/1995 | Lichtenhan et al. ............ 528/9 |
| 5,484,867 | A | * | 1/1996 | Lichtenhan et al. ............ 528/9 |
| 5,589,562 | A | | 12/1996 | Lichtenhan et al. ............ 528/9 |
| 5,773,134 | A | * | 6/1998 | Inokuchi et al. ............. 428/220 |
| 5,907,019 | A | * | 5/1999 | Itoh et al. ................... 525/477 |
| 5,939,576 | A | * | 8/1999 | Lichtenhan et al. .......... 556/40 |
| 5,942,638 | A | | 8/1999 | Lichtenhan et al. ......... 556/460 |
| 6,100,417 | A | | 8/2000 | Lichtenhan et al. ......... 556/460 |
| 6,265,069 | B1 | * | 7/2001 | Bomal et al. ............... 428/405 |
| 6,329,490 | B1 | * | 12/2001 | Yamashita et al. ............ 528/42 |
| 6,362,279 | B2 | * | 3/2002 | Lichtenhan et al. ......... 525/105 |
| 6,440,550 | B1 | * | 8/2002 | Hacker .................... 428/312.6 |
| 2002/0052434 | A1 | * | 5/2002 | Lichtenhan et al. ......... 524/261 |

OTHER PUBLICATIONS

Zheng, et al. Polymer Preprints 2000, 41(2), 1929 (abstract).*
Blanski et al. Polymer Preprints 2001, 42(1), 173 (abstract).*
Blanski et al., Abstr. Pap.—Am. Chem. Soc. 2001, 221st, POLY–266 (abstract).*
Hawley's Chemical Dictionary, 14th Ed.; Lewis, R. J., Sr.; John Wiley & Sons, Inc.. New York, 2001.*

* cited by examiner

Primary Examiner—David W. Wu
Assistant Examiner—Rip A. Lee
(74) Attorney, Agent, or Firm—Dilworth & Barrese, LLP

(57) ABSTRACT

Compositions include blends of ethylene-based polymers and polyhedral oligomeric silsesquioxanes (POSS) or polyhedral oligomeric silicates (POS), having hydrocarbon substitution and processes for producing such compositions.

18 Claims, 5 Drawing Sheets

BLENDS OF ORGANIC SILICON COMPOUNDS WITH ETHYLENE-BASED POLYMERS

GOVERNMENT RIGHTS

This invention was made with Government support under NSF Grant DMR 9732653. The Government has certain rights in the invention.

BACKGROUND

1. Technical Field

The present disclosure relates to blending certain polyhedral oligomeric silsesquioxanes (POSS) or polyhedral oligomeric silicates (POS) with ethylene-based polymers. The addition of POSS and/or POS reduces flammability, improves oxidation resistance, increases permeability to gases, and improves heat distortion temperature and mechanical strength of the polymers.

2. Background of Related Art

Ethylene polymers are well known in the art. In general, polyethylenes are divided into the following groups: High Pressure, Low Density Polyethylenes (LDPE); Linear Low and Medium Density Polyethylenes (LLDPE); High Density Polyethylenes (HDPE); Ultrahigh Molecular Weight Polyethylenes; and Modified Polyethylenes.

The physical state of a polymer is dependent upon its temperature. At low temperatures, polymers are physically stiff and act like glass. Upon heating to a temperature within a range known as the glass transition region, polymers soften and behave in a leathery or rubbery manner. The glass transition temperature, $T_g$, the temperature at which a polymer changes from glassy to rubbery behavior, is an important property used to characterize a polymer. Qualitatively, the glass transition temperature can be interpreted as the temperature at which the chain segments of a polymer exhibit long-range, coordinated molecular motion. In a physically or chemically crosslinked system, the number of chain segments involved in coordinated molecular motion is reduced, which results in an increase in $T_g$.

The $T_g$ of polymers can be observed experimentally by measuring various thermodynamic, physical, or mechanical variables as a function of temperature. The most direct determination of $T_g$ involves measuring the effects of temperature changes on Young's modulus, a fundamental measure of the stiffness of a material when stretched. Young's modulus is defined as follows:

$$E = \sigma/\epsilon$$

where $\sigma$ and $\epsilon$ represent the tensile stress and strain, respectively. The higher the value of Young's modulus, the more resistant the material is to deformation.

The use of dynamic mechanical analysis (DMA) to study the effects of temperature on the stiffness of polymers is well known to those skilled in the art of polymer (or copolymer) characterization. In DMA, Young's modulus has a more complex definition:

$$E = E' + iE''$$

where E' is the storage modulus and E" is the loss modulus. The storage modulus is a measure of the energy stored elastically during deformation, and the loss modulus is a measure of the energy converted to heat.

The loss factor, or loss tangent, is another equation widely used by those skilled in the art of polymer (or copolymer) characterization to determine the value of $T_g$. The loss tangent, tan δ, is the ratio of loss modulus to storage modulus and is defined as follows:

$$\tan \delta = E''/E'$$

In DMA, the maximum value of E" or tan δ during a temperature scan can be used to determine the value of $T_g$.

Instead of stretching, the molten polymer may be subjected to shearing deformation to determine its viscosity. The viscosity of a polymer melt is strongly related to the molecular properties of the polymer including, but not limited to, molecular weight, molecular weight distribution, and crosslinking. Due to the limited mobility of polymer chains, a physically and/or chemically crosslinked polymer system has a higher viscosity than a non-crosslinked polymer system. In rheological studies of polymer melts the shear stress, f, is closely related to the viscosity, η, by the following equation:

$$f = \eta (ds/dt)$$

where f and s represent the shear stress and strain, respectively, and t is time. A polymer melt that is physically and/or chemically crosslinked is sometimes referred to a gel sample; in such a case, the shear stress is referred to as "gel strength" and a higher shear stress at the same shear rate indicates a higher gel strength.

Polyhedral oligomeric silsesquioxane or polyhedral oligosilsesquioxane (POSS) cage molecules and polyhedral oligomeric silicate (POS) (spherosilicate) cage molecules or reagents are organic silicon compounds that are increasingly being utilized as building blocks for the preparation of novel catalytic materials and as performance enhancement additives for commodity and engineering polymers. The physical sizes and structures of POSS and POS reagents are on the nanometer dimension ($10^{-9}$ m). Accordingly, POSS and POS reagents are frequently described as the smallest "silica-like" particles possible. Their nanometer size and unique hybrid (inorganic-organic) chemical composition are responsible for the many desirable property enhancements which have been observed upon incorporation of POSS/POS reagents into polymer systems. POSS and POS exhibit a number of potentially useful properties including high temperature stability in air and good adhesion to a number of substrates. POSS and POS are also resistant to oxidation and degradation by ultraviolet light.

The preparation of functionalized POSS monomers and their use in the synthesis of polymers has been previously disclosed. For example, U.S. Pat. No. 5,484,867 discloses a process for the preparation of reactive POSS monomers which can be chemically reacted with oligomers, polymers, catalysts or co-monomers to form polyhedral silsesquioxane polymers containing silsesquioxanes as pendant, block, or end group segments. As another example, U.S. Pat. No. 5,939,576 discloses a process for the preparation of reactive POSS and POS (spherosilicate) by metal catalyzed hydrosilylation reactions of silane containing POSS or POS with olefinic reagents bearing functionalities useful for grafting reactions, polymerization chemistry and sol-gel process. The functionalized POSS or POS monomers prepared by the above two patents are used to prepare polymer systems wherein POSS or POS is chemically linked to a polymer.

The chemical copolymerization of these functionalized POSS or POS monomers with other oligomers, polymers, catalysts or co-monomers has several drawbacks. First, POSS and POS exhibit a well-known propensity to form insoluble, intractable gels. In addition, both the functionalization and the copolymerization processes are expensive and difficult to control. Further, the resulting chemical copolymers, because of their highly crosslinked nature, have been difficult to handle, purify and characterize. The polymer quality and utility is limited due to impurities which arise from side reactions during synthesis and the resulting polymers have a limited shelf life because they contain reactive functionalities. Also, the copolymers have increased viscosity which, in many cases, is undesirable.

Accordingly, the need still exists for ethylene-based copolymers which are essentially free of impurities and whose properties may be enhanced and controlled by the incorporation of POSS and/or POS in the polymer.

SUMMARY

The present invention meets these needs by providing compositions of ethylene-based polymers physically blended with certain hydrocarbon-substituted POSS and/or POS molecules. These blends have been found to exhibit enhanced properties, including, for example, elastometric properties, reduced flammability, increased glass transition temperature, increased permeability to gases, and improved UV stability, oxidation resistance, heat distortion temperature and/or mechanical strength.

The present compositions contain at least one ethylene-based polymer blended with a POSS and/or a POS having hydrocarbon substitution.

When present, the POSS utilized in the present blend compositions has the general formula $[RSiO_{1.5}]_n$ where n is an even number and R is selected from the group consisting of substituted or unsubstituted aliphatic or aromatic hydrocarbon groups having one to thirty carbon atoms. When POS is utilized in the present blends, the POS has the general formula $[RMe_2SiOSiO_{1.5}]_n$ where n is an even number and R is selected from the group consisting of substituted or unsubstituted aliphatic or aromatic hydrocarbon groups having one to thirty carbon atoms.

The POSS and/or POS is present in the blend compositions in an amount up to about 30% by weight of the blend. In a preferred embodiment, the POSS and/or POS is 1 to about 20% by weight of the blend. It is most preferred to have POSS and/or POS present in an amount from about 2 to about 10% by weight of the blend.

Methods for making compositions containing at least one ethylene-based polymer and at least one hydrocarbon-substituted POSS and/or POS are also described. The blending or mixing process can be carried out by melt blending or solution blending the polymer(s) and cage molecule(s). In a preferred embodiment, the blend is obtained by physically combining the ethylene-based polymer with the POSS and/or POS to form a mixture and then heating the mixture to a temperature above the glass transition temperature of the polymer while stirring.

Without wishing to be bound by any theory, it is believed that the dispersed POSS or POS molecules behave as physical crosslinkers in the matrix of ethylene-based polymers to which they are added and impart enhanced characteristics without undesirable characteristics that can result from chemical cross-linking.

DESCRIPTION OF PREFERRED EMBODIMENTS

Figure 1:
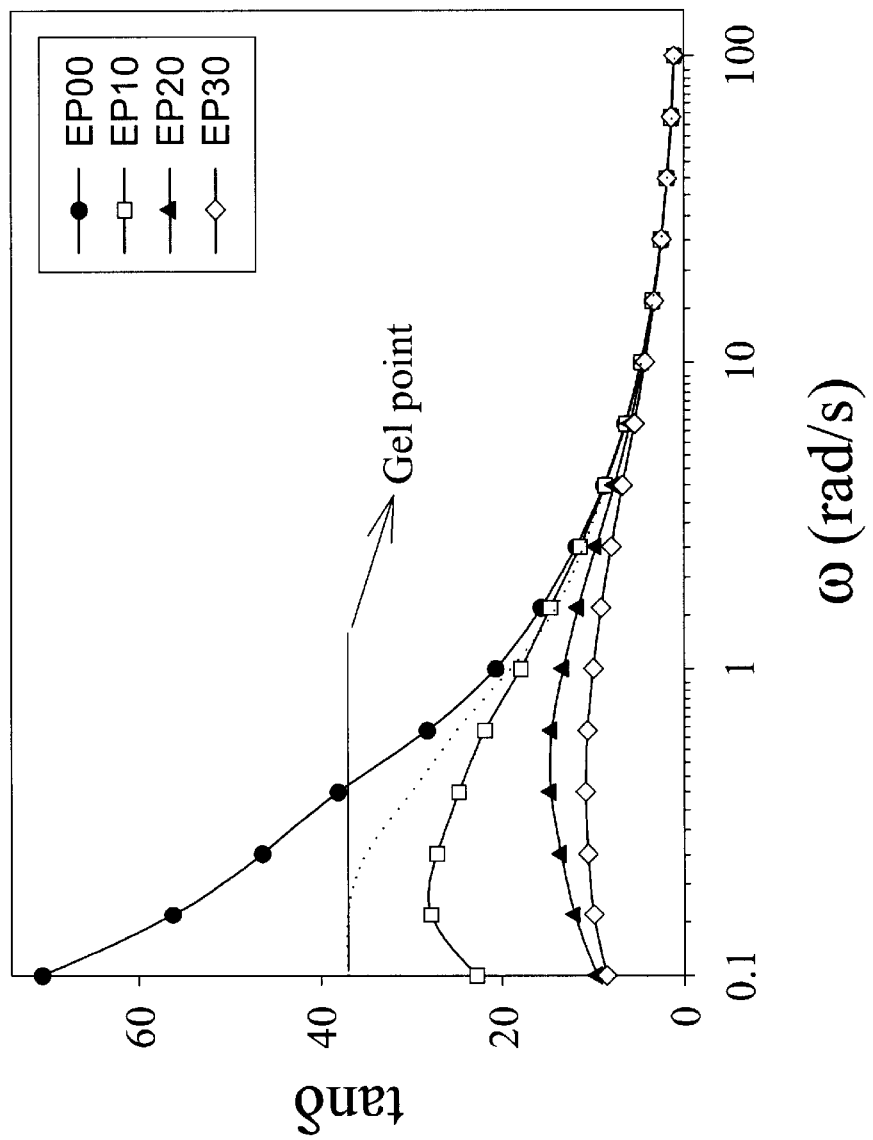
FIG. 1 is a graph of the results of small-amplitude oscillatory shear experiments showing the frequencies obtained for octamethyl-POSS-ethylene copolymer blends. These frequencies demonstrate the gel point at which the samples exhibited solid-like behavior.

The present compositions contain at least one ethylene based polymer blended with a hydrocarbon-substituted POSS, POS or both. The present blend compositions exhibit one or more enhanced properties compared to the same polymer not blended with a hydrocarbon-substituted POSS or POS.

POSS molecules useful herein have the general formula $[RSiO_{1.5}]_n$ and have the following general structure

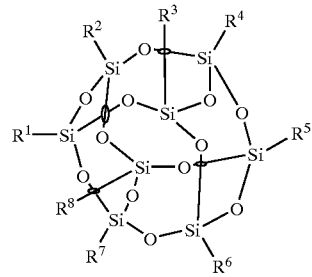

Where n is an even number and R is the same or different at each occurrence and is selected from the group consisting of substituted or unsubstituted aliphatic or aromatic hydrocarbon groups having one to thirty carbon atoms, preferably, 2 to 20 carbon atoms, and most preferably, 4 to 12 carbon atoms. The hydrocarbon groups can be cyclic, branched or straight chained. The hydrocarbon groups can be saturated or may contain unsaturation. The hydrocarbon groups can be unsubstituted or substituted with one or more groups selected from the group consisting of methyl, ethyl, isobutyl, isooctyl, cyclopentyl, cyclohexyl, vinyl, styrl, trimethylsiloxyl, trichlorosilylethyl, trichlorosilylpropyl, dichlorosilylethyl, chlorosilylethyl, phenyl, chlorobenzyl, cyanoethyl, cyanopropyl, norbomenyl, fluoro, silanol, dimethylsilane, alkoxy, methacrylate, silane, aniline, amine, phenol, and alcohol. In certain embodiments, the hydrocarbon group is partially fluorinated or perfluorinated. Suitable R groups include, for example, cyclohexyl, cyclopentyl, methyl, isobutyl, octamethyl and octaisobutyl groups.

The functionalized POSS molecules can be prepared by processes known to one skilled in the art, such as, for example, the processes taught by U.S. Pat. Nos. 5,484,867 and 5,939,576, the disclosures of which are incorporated herein by reference. Suitable POSS materials can be obtained from commercial sources such as Hybrid Plastics (Fountain Valley, Calif., USA).

POS molecules useful herein have the general formula [RMe$_2$SiOSiO$_{1.5}$]$_n$ and have either of the following general structures:

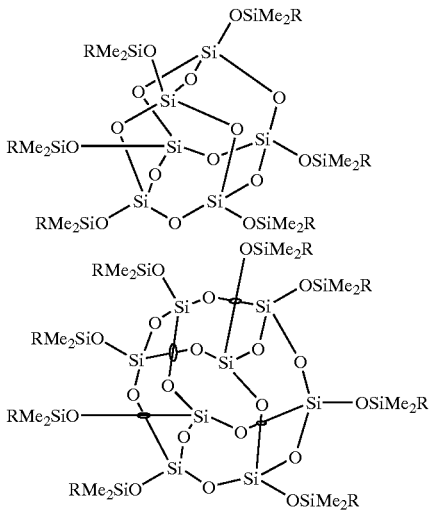

where n is an even number and R is as defined above in connection with the POSS formula.

To produce the present blend compositions, the functionalized POSS or POS are blended with at least one ethylene-based polymer. As used herein, the term "ethylene-based polymer" means any polymer containing a major proportion of repeating units derived from ethylene. Thus, ethylene homopolymers as well as copolymers of ethylene with other monomers (such as, for example, alpha olefins) are included within the definition of ethylene-based polymers. The ethylene-based polymer can be substituted or unsubstituted and may be linear, branched, dendritic or of any other configuration. When a copolymer, the ethylene-based polymer can be a statistical copolymer, a block copolymer (e.g., AB, ABA, ABAB, etc.) a segmented copolymer or a copolymer of any molecular architecture.

Polyethylenes typically have a high degree of crystallinity which, along with the melting temperature, greatly affects the physical properties of the polymers. Preferred polyethylenes and/or ethylene-based polymers have a low degree of crystallinity and are classified as thermoplastic polyolefins. In one embodiment, the ethylene-based polymer has a crystallinity of less than about 20%. A crystallinity of less than about 10% is more preferred. A crystallinity of less than about 5% is most preferred. In these low crystallinity ethylene-based polymers, the final properties of the polymer depend on, among other things, the degree of cross-linking (both chemical and physical), the molecular weight of the polymer, the length of any branched chains, etc.

When the ethylene-based polymer is a copolymer, the composition percentage of ethylene in the copolymer can range from 50–99%, preferably 55 to 85%. In addition, when the ethylene-based polymer is a copolymer including an alpha-olefin, suitable alpha-olefins include, but are not limited to those having from 2 to 20 carbon atoms, with alpha-olefins having 4 to 12 carbon atoms being preferred. The preferred alpha-olefins to be copolymered with ethylene are but-1-ene, pent-1-ene, hex-1-ene, 4-methylpent-1-ene and oct-1-ene. Examples of higher olefins that can be copolymerised with the primary ethylene or propylene monomer, or as a partial replacement for the C$_3$–C$_8$ alpha-olefin comonomer are dec-1-ene and ethylidene norbornene.

When the composition contains copolymers of ethylene with alpha-olefins, the ethylene is present as the major component and is preferably present in an amount of at least 50%, preferably at least 65% of total monomer/comonomer.

The composition according to the present invention may contain linear low density polyethylene (LLDPE) based on copolymers of ethylene with but-1-ene, 4-methylpent-1-ene or hex-1-ene. The addition of POSS and POS with varying R groups can enhance the compatibility of POSS and POS with the polymer and can be used to control and enhance the elastomeric and physical properties of the polymers. While not wishing to be bound to any particular theory, it is believed that the R group enhances the ability of the POSS and/or POS to become physically, but not chemically, linked with the ethylene-based polymer and thus impart the desired characteristics of the blends without the undesirable characteristics resulting from chemical cross-linking. Such properties include improved UV stability, reduced flammability, improved oxidation resistance, increased permeability to gases and improved heat distortion temperature and mechanical strength. In addition, the POSS or POS can be used as quality control aids in creating reproducible elastic properties for processing the polymers.

The POSS and/or POS are physically blended with the ethylene-based polymer. Suitable mixing processes include melt blending using routine processing equipment or solution blending. Where solution blending is used, a solution containing the POSS and the polymer is mixed in a blending device such as a Henschel™ mixer, or a soaking device such as a simple drum tumbler. However, because of the availability of melt blending equipment in commercial polymer processing facilities, melt processing procedures are generally preferred. In general, melt blending includes mixing the POSS or POS with the ethylene-based polymer and any additives, heating the mixture to melting while agitating the mixture, and cooling the compound. Examples of equipment used in melt blending methods include co-rotating and counter-rotating extruders, disc-pack processors and other commonly used extrusion equipment. Other equipment that may be used include roll mills, biaxial screw kneading extruders, or Banbury™ or Brabender™ mixers.

In a preferred embodiment, the POSS and/or POS and the ethylene-based polymer are premixed. Preferably, hydrophobic additives are dissolved into the POSS or POS prior to adding the POSS or POS to the ethylene-based polymer. Suitable hydrophobic additives are known to those skilled in the art and include, for example, low molecular weight ethylene-propylene copolymers, diene terminated low molecular weight ethylene-propylene terpolymers, low molecular weight ethylene polymers, maleic anhydride. Hydrophilic additives and particulate additives are preferably emulsified or mixed into the POSS or POS prior to adding the ethylene-based polymer. Suitable hydrophilic additives are known to those skilled in the art and include, but are not limited to, aminobutyric acid, aminoheptanoic acid, and surfactants. Suitable particulate additives are also known to those skilled in the art and include, for example, layered silicates, mica, molecular silica, carbon black, and carbon nanotubes. The mixture is then quickly heated to a temperature above the polymer's glass transition temperature ($T_g$) or its melting point temperature ($T_m$). Preferably, the temperature of the mixture does not exceed the volatilization temperature of any component. For most of the materials used herein, temperatures in the range of about 60° C. to about 170° C. are preferred. A heating time of about 30 minutes or less is preferred. A heating time of about 10 minutes or less is more preferred. Even more preferred are heating times of about 5 minutes or less. Stirring or agitation is preferred to create a homogeneous mixture.

Next, the mixture is cooled, preferably to room temperature. When injection molding equipment and cast molds are used, the mixture may be cooled by running coolant through the mold, by the thermal mass of the mold itself, by room temperature, by a combination of the above methods, or other methods. Extruded mixtures are cooled by air or by passing the extruded mixture through coolant. Cooling times of about 30 minutes or less are preferred. A cooling time of less than 5 minutes is most preferred.

Use of high shear facilitates shorten heating times. "High shear", for purposes of this disclosure, is defined in terms of the length over diameter (L/D) ratio of a properly designed injection molding single screw or extruder single screw. L/D ratios of about 20:1 and higher create high shear. Twin screws, Banbury mixers and the like also create high shear. High shearing with heat mixes compounds at lower temperatures and faster rates than the use of heat alone or heat with relatively low-shear mixing. Thus, high shear forces expedite compounding of the mixture over a relatively short period of time by more readily forcing the POSS into close association with the copolymer. Use of high shear also facilitates the decrease of equipment temperatures. Melt blending techniques which employ little or no shear require an external heat source. Thus, in order to avoid heat loss, the periphery of many types of melt blending equipment must be heated to a temperature higher than the melt temperature in order to transfer heat and melt a component mixture. In comparison, high shearing equipment can generate high material temperatures directly from the shear forces, substantially reducing or eliminating the need for external heating. Other equipment, such as batch mixers, are also useful for melt blending the preferred materials of the present invention.

The resulting blends contain POSS and/or POS molecules dispersed in the matrix of ethylene-based polymers. The composition percentage of the POSS in the final blended composition can range up to about 30%, preferably about 1 to about 20%, most preferably about 5 to about 10%. The POSS and/or POS molecules are not chemically crosslinked with the ethylene-based polymers, but, instead, are believed to behave as physical crosslinkers. The characteristics obtained by melt blending, which results in physical crosslinking, are significantly different than those obtained by chemical crosslinking. Chemical crosslinking is expensive and difficult to control, especially at higher temperatures. Chemical crosslinking also increases the viscosity of the resulting composition, which is undesirable in the intended applications. To the contrary, the blends according to the present disclosure have improved physical and mechanical properties, which include, but are not limited to, enhanced elastomeric properties, higher heat distortion and end-use temperatures; improved UV stability; enhanced strength; improved fire-retardation properties; and greater resistance to oxidation. Reproducible elastic properties obtained for the blends can be used as quality control aids.

Knowledge of the rheological behavior of polymers near their gel point is of great practical importance. The gel point, where the melted polymer exhibits rheological behavior as a gel, can be altered by adjusting the concentration of POSS molecules. In accordance with the present invention, it has been discovered that POSS molecules introduced into polymer melts will affect the rheological behavior of ethylene-based polymers in the molten state and cause a transition from liquid-like behavior to solid-like behavior. The effect of the POSS molecules is caused by the physical interaction between the POSS molecules and the polymer chains. This interaction includes physical entanglement as well as van der Waals forces. These findings are important for polymer processing because the composition of the POSS-polymer mixture can be adjusted to control the rheological behavior of the molten polymer. Mixing proper amounts of POSS can help the polymer reach the melt point, where molding can occur without further heat. As a result, blends are obtained with reduced time and energy costs using conventional processes. In addition, POSS can enhance molecular orientation in polymers during processing, which leads to products exhibiting superior mechanical properties.

In another aspect, the present disclosure contemplates blends of POSS, POS or both with propylene-based polymers. As used herein, the term "propylene-based polymers" means any polymer containing a major proportion of repeating units derived from propylene. Thus, propylene homopolymers as well as copolymers of propylene with other monomers are included within the definition of propylene-based polymers. The propylene-based polymers can be substituted or unsubstituted and may be linear, branched, dendritic or of any other configuration. When a copolymer, the propylene-based polymer can be a statistical copolymer, block copolymer, segmented copolymer or a copolymer of any other molecular architecture. The blends can be prepared using the same techniques and amounts of ingredients as described above for the ethylene-based polymer compositions.

EXAMPLES

The following examples are merely illustrative of certain aspects of the invention and should not be construed as limiting the invention in any manner.

Example 1

An ethylene-propylene copolymer (EP) containing 59.3 weight percent (wt %) of ethylene was used in this study. The molecular weight of the polymer determined by gel permeation chromatograph (GPC) was Mn=79000, Mw=108000. The melting temperature determined by differential scanning calorimetry (DSC) was in the range of 120–125° C. Octamethyl-POSS ($C_8H_{24}O_{12}Si_8$) and octaisobutyl-POSS ($C_{32}H_{72}O_{12}Si_8$) were obtained from Hybrid Plastics (Fountain Valley, Calif.). The molecular weight of octamethyl-POSS and octaisobutyl-POSS are 536.96 g/mol and 873.60 g/mol, respectively. A twin screw mixer (MicroCompounder, DACA Instruments) was used to prepare the mixture of EP and POSS samples. The EP and POSS were mixed thoroughly for 15 minutes at 160° C. Table 1 shows the wt % of POSS for the six samples that were prepared.

TABLE 1

| Sample ID | EP00 | EP10 | EP20 | EP30 | EPI20 |
|---|---|---|---|---|---|
| POSS type | Octamethyl | Octamethyl | Octamethyl | Octamethyl | Octaisobutyl |
| POSS Weight percent (%) | 0 | 10 | 20 | 30 | 20 |

Small-amplitude oscillatory shear experiments were performed on a strain-controlled rheometer RMS-605E (Rheometric Scientific) with 25 mm parallel plates. Rheological experiments started out by melting a sample at 160° C. for 15 minutes in order to remove the effect of thermal history. Afterwards, the sample was brought to the experimental temperature. Rheology measurements were performed at frequencies between 0.1 and 100 rad/s. The strain amplitude was $\gamma_a$=8%. All rheological tests were carried out under the flow of nitrogen.

The frequency independence of tan δ can be used to determine the gel point. For polymer melts, the value of tan δ exhibits a negative slope as long as the polymer melt is in the molten state. At the gel point, tan δ is independent of frequency in the low frequency zone. Therefore, a plateau value should be observed. After the gel point, the polymer behaves as a solid tan δ has a positive slope. The frequencies for the octamethyl-POSS copolymer samples are set forth in FIG. 1. As can be seen in FIG. 1, the pure EP copolymer (EP00) exhibited a negative slope in the low frequency zone at 160° C., which indicates that the sample had liquid-like rheological behavior. However, after adding 10 wt % octamethyl-POSS into the polymer matrix (sample EP10), the slope of tan δ was positive, which indicates the transition from a liquid-like behavior to a solid-like behavior. The gel point at 160° C. (presented as a dotted line in FIG. 1) is between 0 wt % and 10 wt % POSS and is roughly 5 wt %. All other EPs containing higher octamethyl-POSS concentrations showed positive slopes in the low frequency zone. In addition, the transition position was shifted to a higher frequency level with higher concentrations of POSS. This finding indicates that the transition from liquid-like behavior to solid-like behavior is due to the addition of POSS molecules, which act as physical cross-linkers in the polyolefin melts. The POSS molecules, which have a silicon core and eight organic arms, are relatively large in size (diameter ~10 Å). Thus, the physical interaction is rather strong since the POSS molecules are dispersed at the molecular level. This resulting effect is the physical crosslinking where the dense van der Waals forces around POSS are the main interaction forces.

In summary, EP without POSS showed a typical liquid-like behavior in the molten state. After adding more than 10 wt % octamethyl-POSS, the polymer system showed solid-like behavior. Further addition of POSS molecules enhanced solid-like behavior. The findings indicate that the rheological behavior of EP can be controlled by the addition of POSS molecules in the molten state. The addition of POSS molecules can be used to control the varying polymer processing conditions such as blow molding, extrusion and so forth.

Example 2

Figure 2:
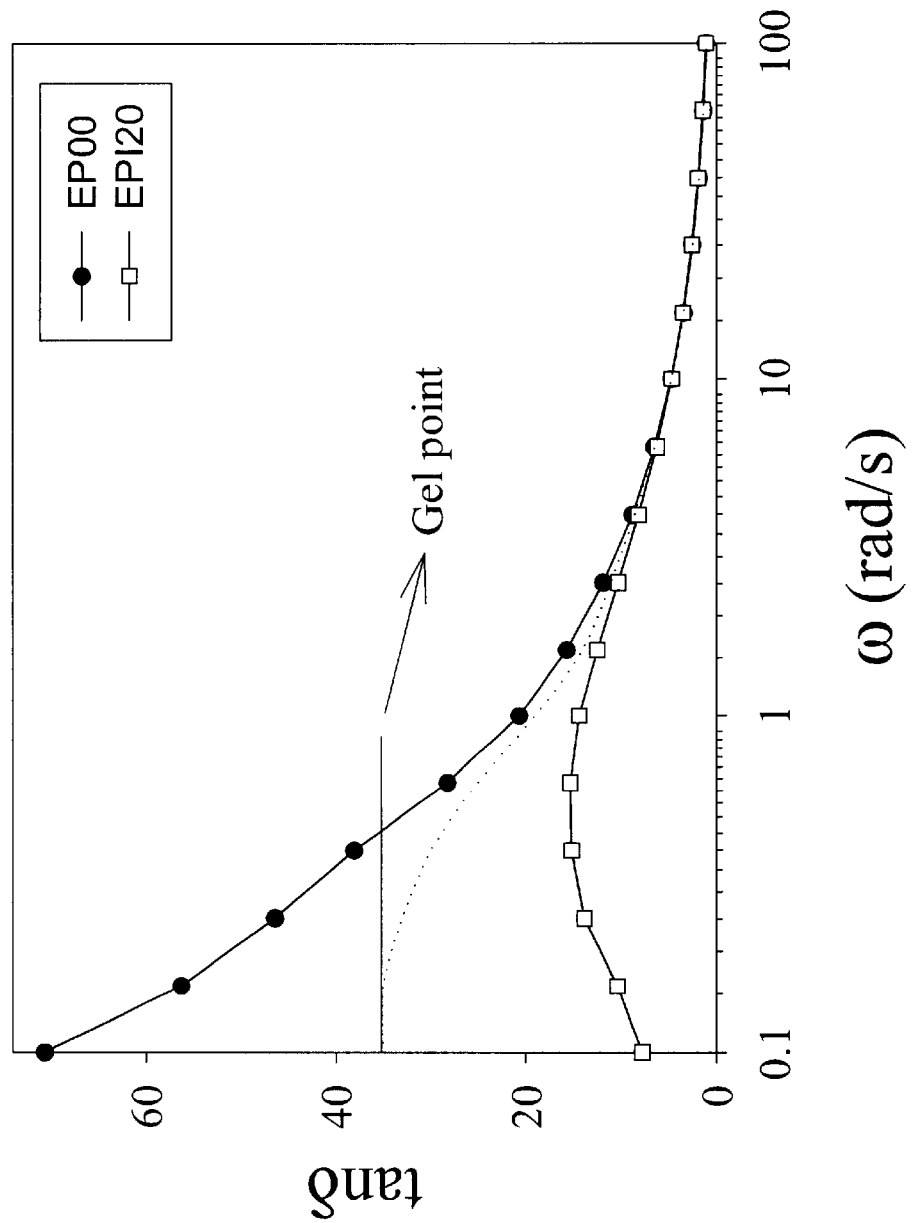
FIG. 2 is a graph of the results of small-amplitude oscillatory shear experiments showing the frequencies obtained for octaisobutyl-POSS-ethylene copolymer blends. These frequencies demonstrate the gel point at which the samples exhibited solid-like behavior.

This example replaced the octamethyl-POSS of Example 1 with octaisobutyl-POSS. The frequencies obtained for these samples are set forth in FIG. 2. As can be seen in FIG. 2, the polymers showed a similar behavior at 160° C. after replacing the octamethyl-POSS with octaisobutyl-POSS. The pure EP copolymer (EP00) exhibited a negative slope in the low frequency zone at 160° C. After adding 20 wt % octaisobutyl-POSS into the polymer matrix (sample EPI20), the slope of tan δ was positive, which indicates the transition from a liquid-like behavior to a solid-like behavior at 160° C. The gel point was about 5 wt % POSS at this temperature. This finding indicates that the transition from liquid-like behavior to solid-like behavior is due to the addition of octaisobutyl-POSS molecules, which act as physical cross-linkers in the polyolefin melt.

In summary, EP without POSS showed a typical liquid-like behavior in the molten state. However, the polymer system showed a solid-like behavior after adding 20 wt % octaisobutyl-POSS molecules. The findings indicate that the rheological behavior of EP can be controlled by different POSS in the molten state. Consequently, one can select the desired kind of POSS while still retain the rheological improvement at the same time.

Example 3

In this example, a stress-controlled rheological study was carried out on mixtures of ethylene propylene copolymers and POSS. Samples of EP and POSS were prepared following the procedures set forth in Example 1. The wt % of POSS in the samples was 0%, 10%, 20% and 30% (designated as EP00, EP10, EP20, EP30), respectively.

Stress-controlled shear experiments were performed in a STRESSTECH HR (ATS RheoSystems, Inc.). This instrument was equipped with parallel plate (diameter 25 mm) geometry. The chosen experimental temperature was 180° C. (about 55° C. higher than the melting temperature of the copolymer). The shear rate was increased from 0.0001 to 0.1 rad/s in order to determine the relationship between shear stress and shear rate over a broad range.

A dynamic mechanical analyzer (Rheometric Scientific) was used to study the thermal mechanical properties of the mixtures and identify the $T_g$ of the samples. Samples were provided in thin strips (0.2 mm) in a tensile mode. After clamping the sample to finger tightness (approximately 10 mN/m torque), a constant force of 0.1 Newtons was applied. The samples were cooled to −80° C. and then heated to 100° C. at a rate of 5° C./min.

Figure 3:
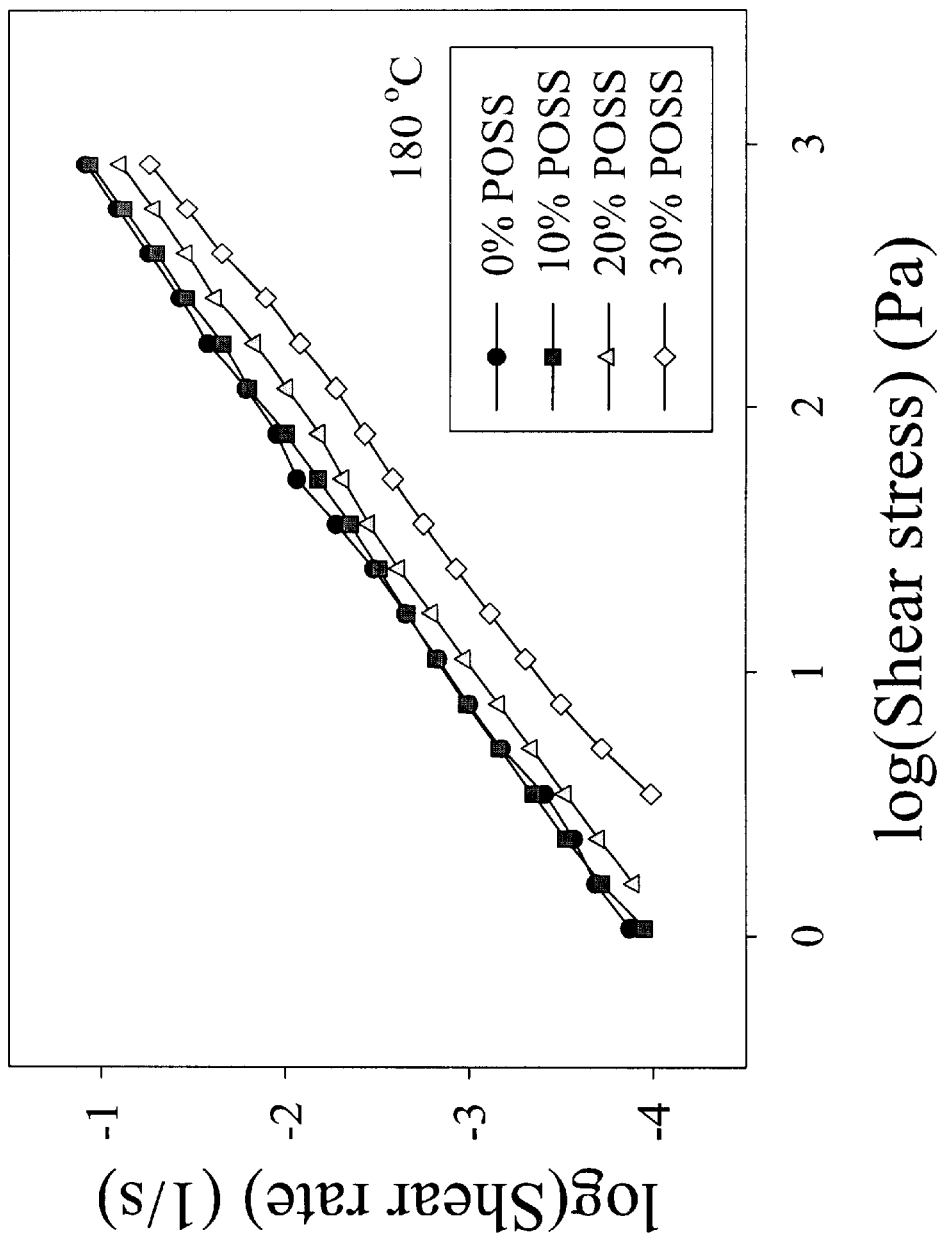
FIG. 3 is a graph of the results of a stress-controlled rheological study carried out on mixtures of ethylene propylene copolymers and POSS. The figure demonstrates both shear stress and shear rate.

FIG. 3 represents the stress-controlled rheological data of samples EP00, EP10, EP20 and EP30, respectively. The x-axis represents the shear stress (in log scale); the y-axis represents the shear rate (in log scale). It was observed that shear stress increased with POSS concentration where the shear rate remained constant. At a shear rate of $10^{-3}$ (1/s), the shear stress of the neat EP copolymer (EP00) had a value of 7.57 (Pa); upon the addition of 20% POSS (EP20), the shear stress increased to a value of approximately 11.2 (Pa); after the addition of 30% POSS (EP30), the shear stress increased dramatically to approximately 24.5 (Pa).

Figure 4:
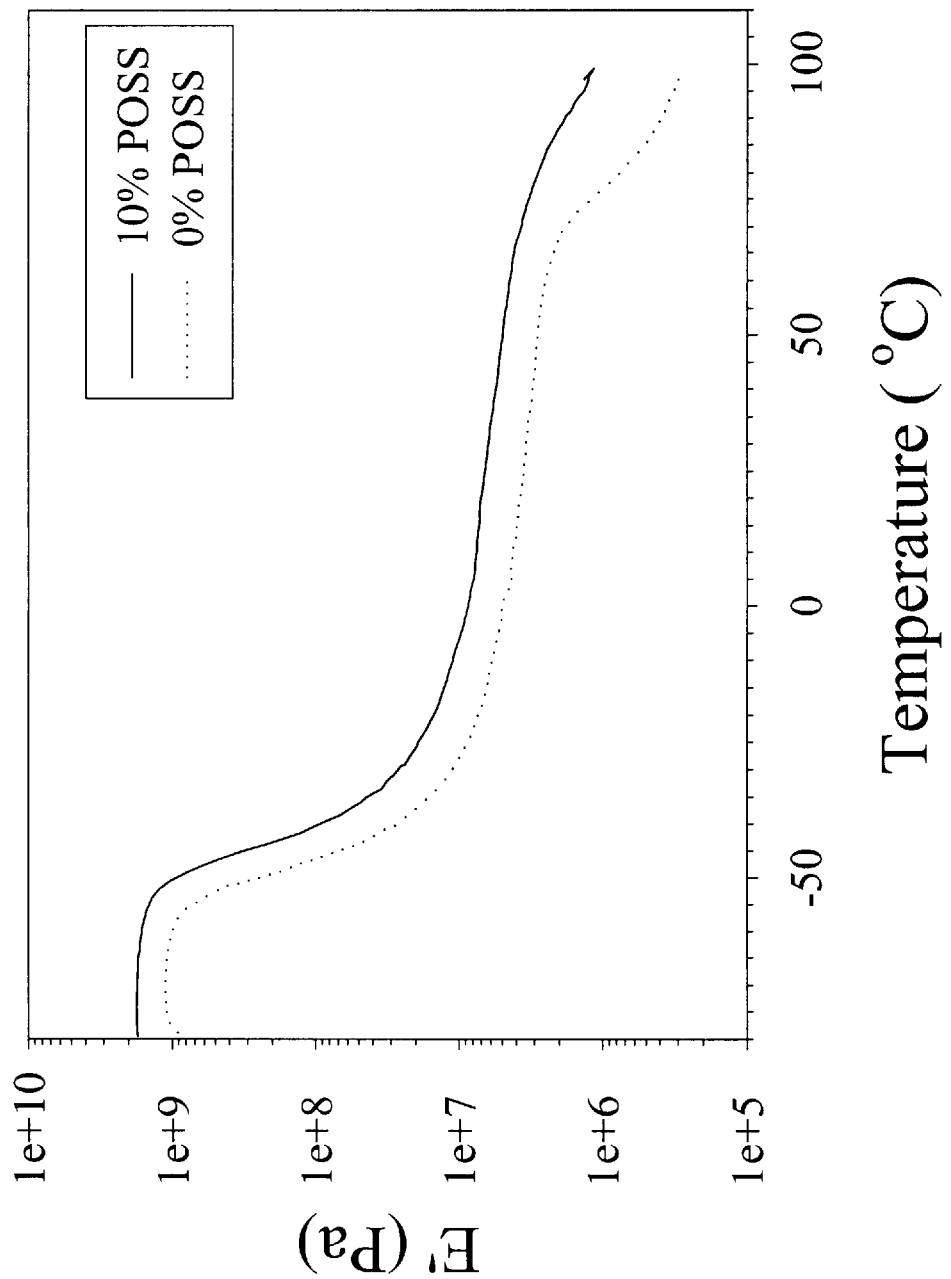
FIG. 4 is a graph demonstrating the changes of the storage modulus component (E') of Young's modulus for two of the copolymers during the temperature scan of the stress-controlled rheological study.

FIG. 4 shows the changes of the storage modulus component (E') of Young's modulus for EP10 and EP00 during the temperature scan. As can be seen from FIG. 4, the addition of 10% POSS resulted in a significant increase in Young's modulus. In the temperature range between −80° C. and 60° C., the Young's modulus of EP10 was about 1.7 times higher than that of EP00. As the temperature approached the melting temperature, the gap between the Young's modulus of EP10 and EP00 became larger; at a temperature of 100° C., the Young's modulus of EP10 was about 5 times higher than that of EP00.

Figure 5:
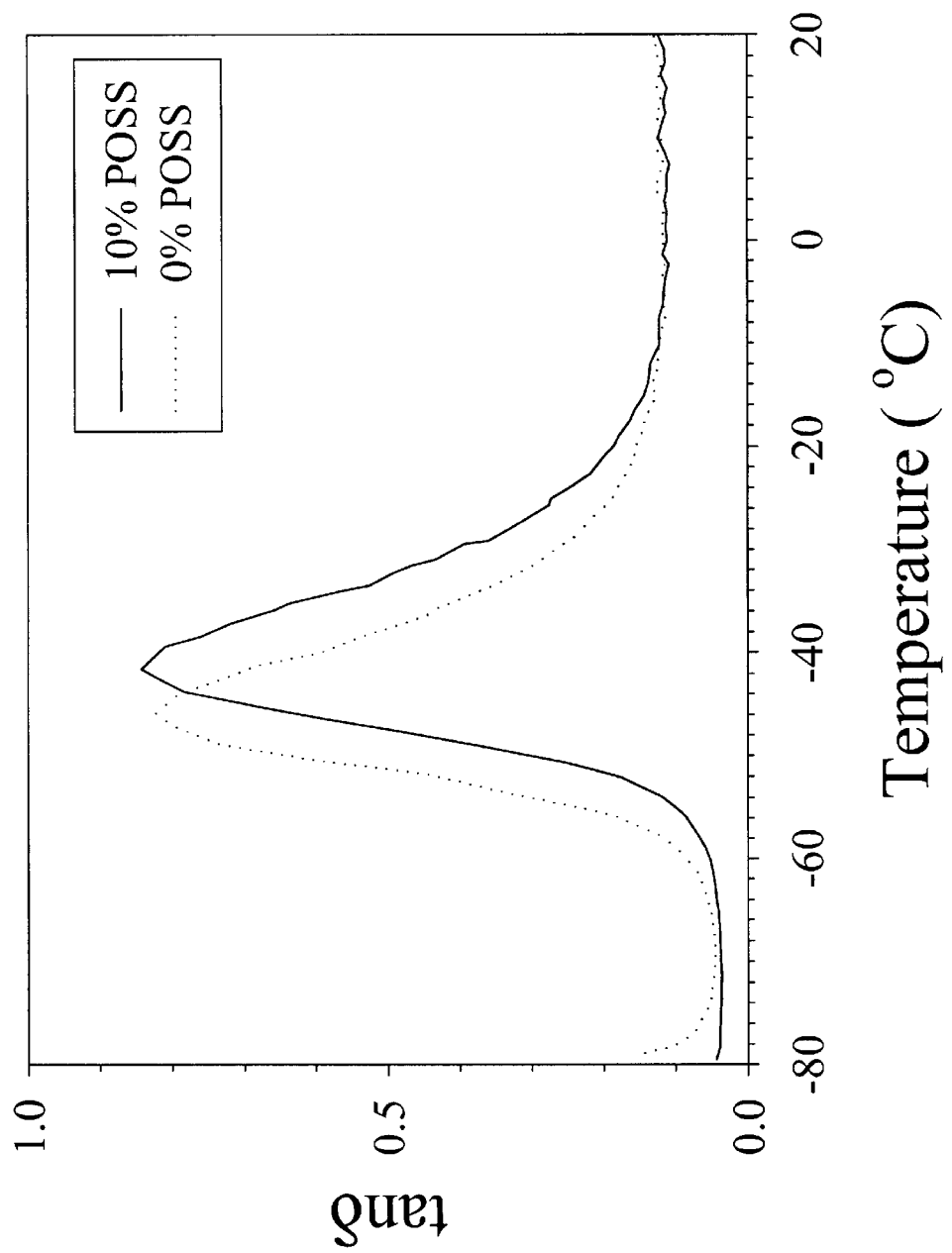
FIG. 5 is a graph demonstrating the glass transition temperature of two of the copolymers during the temperature scan of the stress-controlled rheological study.

FIG. 5 shows the tan δ of EP10 and EP00 during the temperature scan. The maximum of tan δ can be identified as the glass transition temperature ($T_g$) in a dynamic mechanical analysis (DMA) measurement. As can be seen in FIG. 5, the $T_g$ of EP10 was about 5° C. higher than EP00.

The above results clearly indicate that addition of POSS enhances the mechanical properties of EP copolymers by behaving as a physical crosslinker. The addition of 20 wt % POSS (EP20) increased the shear stress by approximately 150% and the addition of 30 wt % POSS (EP30) increased the shear stress by more than 300%. Thus, the shear stress (or physical gel strength) of an EP copolymer can be adjusted by the addition of varying POSS concentrations. Moreover, the increase seen in the Young's modulus upon the addition of 10% POSS demonstrates that POSS strengthened the EP copolymer below its melting temperature, especially at a temperature near its melting point. Finally, the increase in tan δ upon the addition of 10% POSS corresponds to a higher $T_g$, establishing that the addition of POSS molecules improves the heat distortion temperature of the EP copolymers.

It will be understood that various modifications may be made to the embodiments disclosed herein and that the above description should not be construed as limiting, but merely as exemplifications of preferred embodiments. Those skilled in the art will envision other modifications within the scope and spirit of the claims appended hereto.

What is claimed is:

1. A composition comprising: a physical blend of (a) an ethylene-based polymer having a crystallinity of less than about 20%, and (b) one or more organic silicon compounds selected from the group consisting of hydrocarbon-substituted polyhedral oligosilsesquioxanes (POSS) and hydrocarbon-substituted polyhedral oligomeric silicates (POS).

2. The composition of claim 1 wherein the ethylene-based polymer has a crystallinity of less than about 10%.

3. The composition of claim 1 wherein the ethylene-based polymer has a crystallinity of less than about 5%.

4. The composition of claim 1 wherein the ethylene-based polymer is selected from the group consisting of ethylene-propylene copolymers, fluorinated ethylene-propylene copolymers, and hexafluoropropylene-based copolymers.

5. The composition of claim 1 wherein the organic silicon compound is a polyhedral oligosilsesquioxane of the general formula $[RSiO_{1.5}]_n$, where n is an even number and R is selected from the group consisting of unsubstituted aliphatic and aromatic hydrocarbon groups having one to thirty carbon atoms, and aliphatic and aromatic hydrocarbon groups having one to thirty carbon atoms substituted with one or more groups selected from the group consisting of methyl, ethyl, isobutyl, isooctyl, cyclopentyl, cyclohexyl, vinyl, styryl, trimethylsiloxyl, trichlorosilylethyl, trichlorosilylpropyl, dichlorosilylethyl, chlorosilylethyl, phenyl, chlorobenzyl, cyanoethyl, cyanopropyl, norbomenyl, fluoro, silanol, dimethylsilane, alkoxy, methacrylate, silane, aniline, amine, phenol, and alcohol.

6. The composition of claim 5 wherein the polyhedral oligosilsesquioxane is partially fluorinated or perfluorinated.

7. The composition of claim 1 wherein the organic silicon compound is a polyhedral oligomeric silicate of the general formula $[RMe_2SiOSiO_{1.5}]_n$, where n is an even number and R is selected from the group consisting of unsubstituted aliphatic and aromatic hydrocarbon groups having one to thirty carbon atoms, and aliphatic and aromatic hydrocarbon groups having one to thirty carbon atoms substituted with one or more groups selected from the group consisting of methyl, ethyl, isobutyl, isooctyl, cyclopentyl, cyclohexyl, vinyl, styryl, trimethylsiloxyl, trichlorosilylethyl, trichlorosilylpropyl, dichlorosilylethyl, chlorosilylethyl, phenyl, chlorobenzyl, cyanoethyl, cyanopropyl, norbomenyl, fluoro, silanol, dimethylsilane, alkoxy, methacrylate, silane, aniline, amine, phenol, and alcohol.

8. The composition of claim 7 wherein the polyhedral oligomeric silicate is partially fluorinated or perfluorinated.

9. The composition of claim 1 wherein the organic silicon compound comprises up to about 30 percent by weight of the composition.

10. The composition of claim 1 wherein the organic silicon compound comprises from about 1 to about 20 percent by weight of the composition.

11. The composition of claim 1 wherein the organic silicon compound comprises from about 5 to about 10 percent by weight of the composition.

12. The composition of claim 1 wherein the organic silicon compound is selected from the group consisting of octamethyl-POSS and octaisobutyl-POSS.

13. The composition of claim 1 wherein a hydrophobic additive is added to the one or more organic silicon compounds.

14. The composition of claim 13 wherein the hydrophobic additive is selected from the group consisting of ethylene-propylene copolymers, diene terminated ethylene-propylene terpolymers, ethylene polymers, and maleic anhydride.

15. The composition of claim 1 wherein a hydrophilic additive is added to the one or more organic silicon compounds.

16. The composition of claim 15 wherein the hydrophilic additive is selected from the group consisting of aminobutyric acid, aminoheptanoic acid and surfactants.

17. The composition of claim 1 wherein a particulate additive is added to the one or more organic silicon compounds.

18. The composition of claim 17 wherein the particulate additive is selected from the group consisting of layered silicates, mica, molecular silica, carbon black, and carbon nanotubes.

* * * * *